(12) United States Patent
Sheng et al.

(10) Patent No.: US 6,409,211 B1
(45) Date of Patent: Jun. 25, 2002

(54) INFLATABLE SIDE CURTAIN

(75) Inventors: Jianping Sheng, Rochester Hills; Chaoz Hou Chen, Troy, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/685,395

(22) Filed: Oct. 10, 2000

(51) Int. Cl.7 .......................... B60R 21/22; B60R 21/06
(52) U.S. Cl. ..................... 280/730.2; 280/749
(58) Field of Search ............... 280/730.2, 736, 280/743.2, 749, 753, 743.1

(56) References Cited

U.S. PATENT DOCUMENTS

| | | | |
|---|---|---|---|
| 3,897,961 A | | 8/1975 | Leising et al. |
| 5,566,977 A | * | 10/1996 | Wipasuramonton ...... 280/730.2 |
| 5,746,446 A | | 5/1998 | Breed et al. |
| 5,775,726 A | | 7/1998 | Timothy et al. |
| 5,788,270 A | | 8/1998 | Haland et al. |
| 5,865,462 A | | 2/1999 | Robins et al. |
| 6,010,149 A | * | 1/2000 | Riedel et al. ............ 280/730.2 |
| 6,042,141 A | * | 3/2000 | Welch et al. ............ 280/730.2 |
| 6,129,377 A | * | 10/2000 | Okumura et al. ........ 280/730.2 |
| 6,168,191 B1 | * | 1/2001 | Webber et al. ........... 280/730.2 |
| 6,170,860 B1 | * | 1/2001 | Denz et al. .............. 280/730.2 |
| 6,199,898 B1 | * | 3/2001 | Masuda et al. .......... 280/730.2 |
| 6,220,625 B1 | * | 4/2001 | Wallner et al. .......... 280/730.2 |
| 6,231,073 B1 | * | 5/2001 | White, Jr. ................ 280/730.2 |
| 6,237,937 B1 | * | 5/2001 | Kokeguchi et al. ...... 280/730.2 |
| 6,237,941 B1 | * | 5/2001 | Bailey et al. ............ 280/730.2 |
| 6,244,619 B1 | * | 6/2001 | Satzger .................... 280/730.2 |
| 6,250,667 B1 | * | 6/2001 | Wallner ................... 280/730.2 |

FOREIGN PATENT DOCUMENTS

| | | |
|---|---|---|
| EP | 0810128 | 5/1997 |
| WO | 9521753 | 8/1995 |
| WO | 9626087 | 8/1996 |
| WO | 9807598 | 2/1998 |

\* cited by examiner

*Primary Examiner*—Brian L Johnson
*Assistant Examiner*—Joselynn Y Sliteris
(74) *Attorney, Agent, or Firm*—Tarolli, Sundheim, Covell, Tummino & Szabo L.L.P.

(57) ABSTRACT

Apparatus (10) for helping to protect an occupant of a vehicle (12) which has a side structure (16) and a roof (18) comprises an inflatable vehicle occupant protection device (14). The vehicle occupant protection device (14) is inflatable away from the vehicle roof (18) into a position between the side structure (16) of the vehicle (12) and a vehicle occupant. An inflation fluid source (24) provides inflation fluid for inflating the vehicle occupant protection device (14). The vehicle occupant protection device (14) comprises a seam (60) extending in a spiral-like manner from a location (64) within the boundaries of the vehicle occupant protection device to define a spiral-like chamber portion (80) of the vehicle occupant protection device (14).

16 Claims, 2 Drawing Sheets

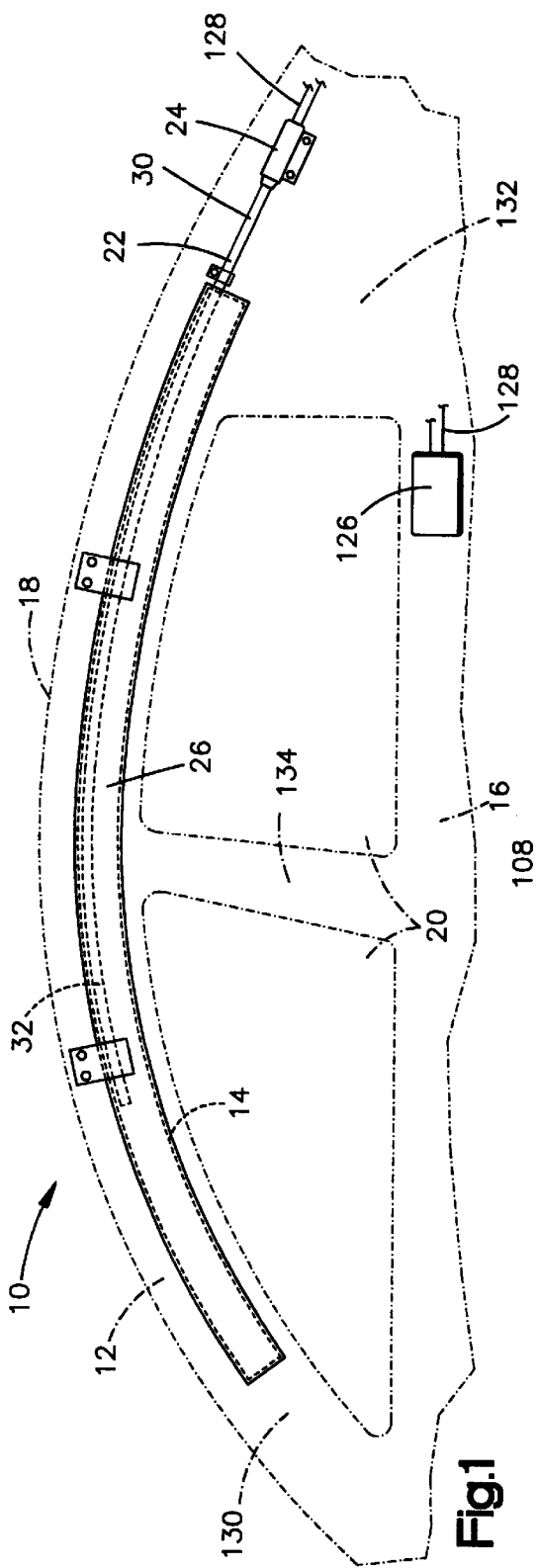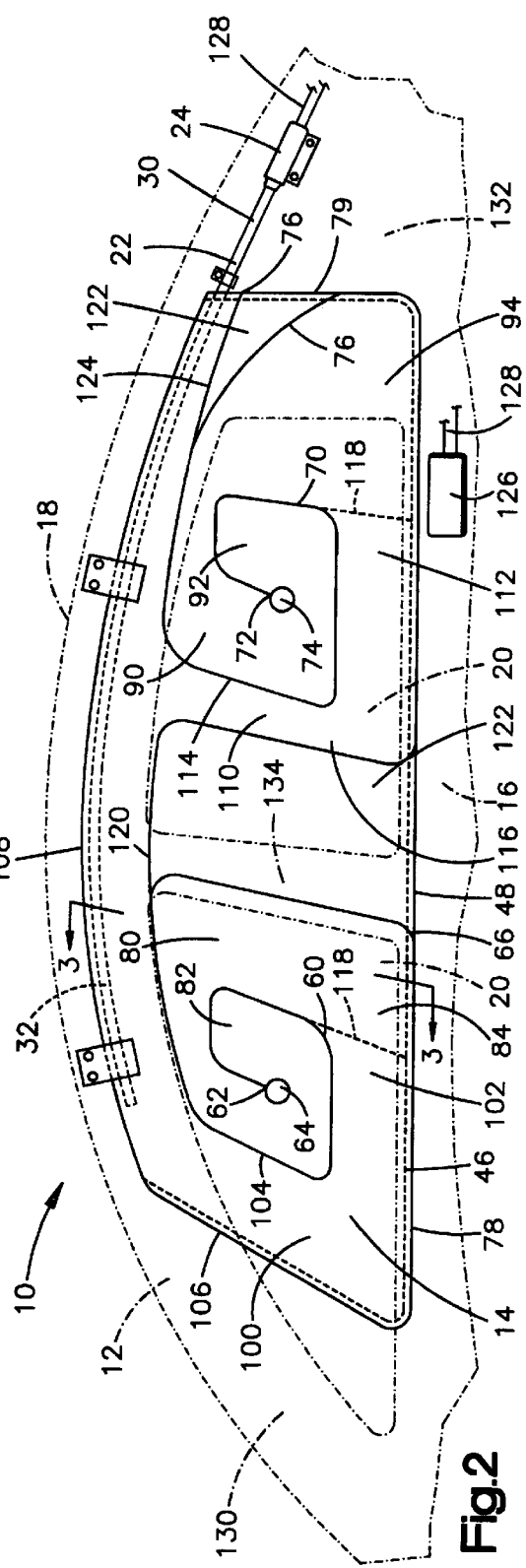

INFLATABLE SIDE CURTAIN

FIELD OF THE INVENTION

The present invention relates to an inflatable vehicle safety apparatus for helping to protect a vehicle occupant in the event of a side impact to a vehicle and/or a vehicle rollover.

BACKGROUND OF THE INVENTION

It is known to inflate a vehicle occupant protection device to help protect a vehicle occupant in the event of a vehicle collision. One particular type of inflatable vehicle occupant protection device is an inflatable curtain that inflates from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain through a fill tube.

SUMMARY OF THE INVENTION

The present invention relates to an apparatus for helping to protect an occupant of a vehicle that has a side structure and a roof. The apparatus includes an inflatable vehicle occupant protection device that is inflatable away from the vehicle roof into a position between the side structure of the vehicle and a vehicle occupant. An inflation fluid source provides inflation fluid for inflating the vehicle occupant protection device. The vehicle occupant protection device comprises a seam that extends in a spiral-like manner from a location within the boundaries of the vehicle occupant protection device to define a spiral-like chamber portion of the vehicle occupant protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an inflatable vehicle safety apparatus illustrating the safety apparatus in a deflated condition;

FIG. 2 is a schematic view of the vehicle safety apparatus of FIG. 1 in an inflated condition.

DESCRIPTION OF PREFERRED EMBODIMENTS

Figure 3:
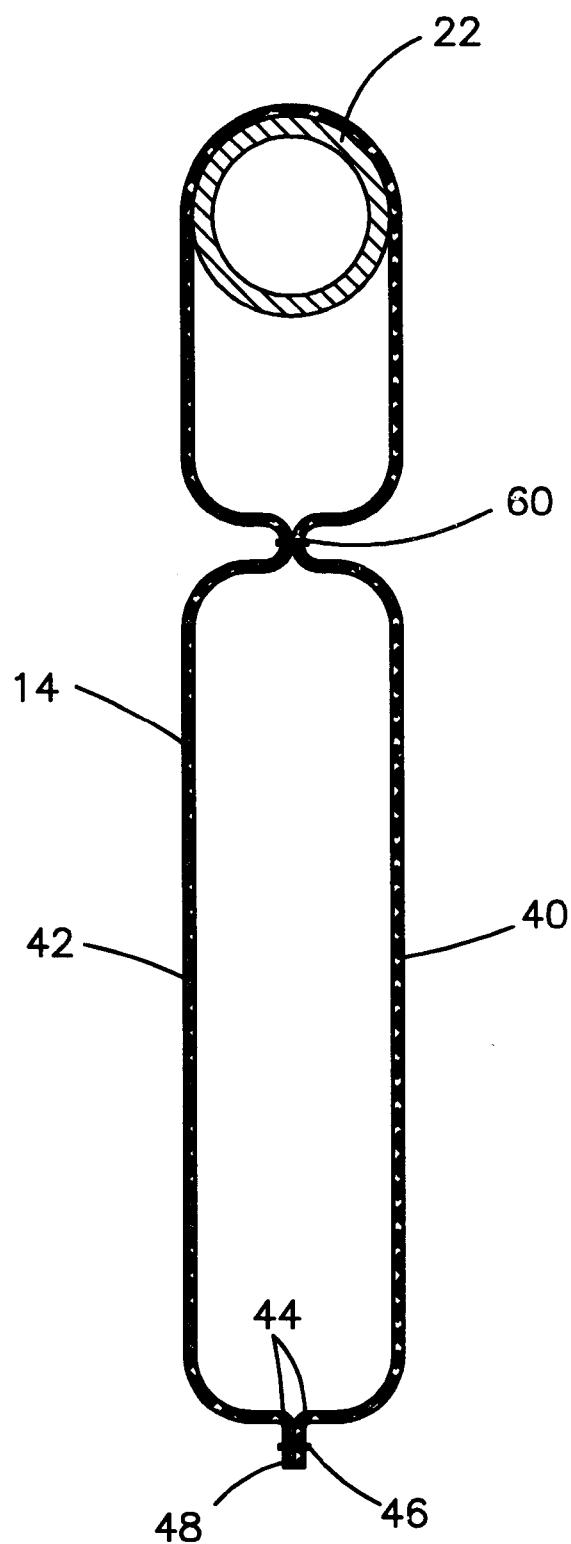
FIG. 3 is a sectional view of the vehicle safety apparatus taken generally along line 3—3 in FIG. 2.

As representative of the present invention, a vehicle safety apparatus 10 helps to protect an occupant of a vehicle 12. As shown in FIGS. 1 and 2, the safety apparatus 10 includes a vehicle occupant protection device in the form of an inflatable curtain 14 that is mounted adjacent to the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14. It will be recognized by those skilled in the art that the fill tube 22 may be omitted and the inflator 24 may be connected in direct fluid communication with the inflatable curtain 14. In such a configuration, the inflator 24 would be connected to an end of the inflatable curtain 14 or to a location on the curtain between the ends of the curtain.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. In fact, the inflator 24 could be of any suitable type or construction for supplying a medium for inflating the inflatable curtain 14.

The safety apparatus 10 includes a housing 26 (FIG. 1) that stores the inflatable curtain 14 in a deflated condition. The fill tube 22, the deflated inflatable curtain 14, and housing 26 have an elongated configuration and extend along the vehicle roof 18 and along the side structure 16 of the vehicle 12 above the side windows 20.

As best illustrated in FIG. 3, the inflatable curtain 14 comprises first and second panels 40 and 42 that are arranged in an overlying manner. Overlapping portions 44 of the first and second panels 40 and 42 are secured together by stitching 46 (FIGS. 2 and 3) that extends along the periphery 48 of the panels. In the illustrated embodiment, the inflatable curtain 14 (FIG. 3) is formed from a sheet of material that is folded over to form the overlying first and second panels 40 and 42. It will be recognized by those skilled in the art, however, that the inflatable curtain 14 could have alternative constructions. For example, the first and second panels 40 and 42 could be formed from separate sheets of material arranged in an overlying manner and secured together by stitching 46 that extends around the entire periphery 48 of the panels to form the inflatable curtain 14.

The first and second panels 40 and 42 are constructed of a fabric, such as nylon, that is coated with a gas impermeable material such as urethane or silicone. The inflatable curtain 14 thus has a substantially air-tight construction. Other materials, such as elastomers, plastic films, or combinations thereof may also be used to construct the inflatable curtain 14. The first and second panels 40 and 42 may also be formed of single or multi-layered sheets of material.

The first and second panels 40 and 42 are connected together along two seams 60 and 70 by known means, such as stitching or weaving. The seams 60 and 70 may be continuous and uninterrupted. Alternative means (not shown) such as dielectric sealing, ultrasonic bonding, heat sealing, and adhesives may also be used to form the seams 60 and 70. The first and second panels 40 and 42 may also be connected together by seams 60 and 70 that comprise tethers which correspond to the shape of the seams and are sewn or otherwise secured to the panels 40 and 42 to interconnect the panels.

The seam 60 has a first end 62 positioned at a location 64 within the boundaries of the inflatable curtain 14. The seam 60 extends from the location 64 in a spiral-like manner and has a second end 66 positioned adjacent to or intersecting a lower edge 78 of the inflatable curtain 14. The seam 70 has a first end 72 positioned at a location 74 within the boundaries of the inflatable curtain 14. The seam 70 extends from the location 74 in a spiral-like manner and has a second end 76 positioned adjacent to or intersecting a rear edge 79 of the inflatable curtain 14.

In the illustrated embodiment, the locations 64 and 74 are circular portions of the inflatable curtain 14 wherein the first and second panels 40 and 42 are secured together by means such as stitching or tethers. The locations 64 and 74 may have an alternative shape, such as a rectangular shape, or the locations may be single points on the inflatable curtain 14 within the boundaries of the curtain.

The seams 60 and 70 define spiral-like first and second chambers 80 and 90, respectively. The first chamber 80 has a first terminal end 82 located within the boundaries of the inflatable curtain 14 and a second terminal end 84 located near a boundary of the inflatable curtain defined by the lower edge 78. The first chamber 80 extends from the first terminal end 82 in a spiral-like manner to the second terminal end 84. In the illustrated embodiment, the second terminal end 84 of the first chamber 80 is near the lower edge 78 of the inflatable curtain 14.

The second chamber 90 has a first terminal end 92 located within the boundaries of the inflatable curtain 14 and a second terminal end 94 located near a boundary of the inflatable curtain defined by the lower edge 78. The second chamber 90 extends from the first terminal end 92 in a spiral-like manner to the second terminal end 94. In the illustrated embodiment, the second terminal end 94 of the second chamber 90 is near the lower edge 78 and the rear edge 79 of the inflatable curtain 14.

The second terminal ends 84 and 94 of the first and second chambers 80 and 90 are in fluid communication with respective first and second generally U-shaped inflatable chambers 100 and 110, respectively, of the inflatable curtain 14. The boundaries between the first and second chambers 80 and 90 and the first and second U-shaped chambers 100 and 110 are indicated generally by the dotted lines 118 in FIG. 2. The first and second U-shaped chambers 100 and 110 provide fluid communication between the first and second chambers 80 and 90.

The first U-shaped chamber 100 has a first end 102 adjacent to the second terminal end 84 of the first chamber 80. The first U-shaped chamber 100 extends from the first end 102, along the bottom edge 78, a front edge 106 and a top edge 108 of the inflatable curtain 14. A wall 104 of the first U-shaped chamber 100 is formed by the seam 60.

The second U-shaped chamber 110 has a first end 112 positioned adjacent to the second terminal end 94 of the second chamber 90. The second U-shaped chamber 110 extends from the first end 112, along the bottom edge 78, through a central portion 116, and along the top edge 108 of the inflatable curtain 14. A wall 114 of the second U-shaped chamber 110 is formed by the seam 70.

It will be recognized by those skilled in the art that the seams 60 and 70 and, thus, the first and second chambers 80 and 90 may have alternative configurations. For example, in the illustrated embodiment, the seams 60 and 70 extend from the locations 64 and 74 in a clockwise direction, as viewed in the figures. The seams 60 and 70, however, could extend from the locations 64 and 74 in a counterclockwise direction. Also, the number of spiral revolutions that the seams 60 and 70 follow may be increased or decreased, thus increasing or decreasing the spiral length of the seams. Such variations in the spiral length and direction of the seams 60 and 70 would also result in varying the spiral length and direction of the first and second chambers 80 and 90.

Overlying parts of the first and second panels 40 and 42 may be secured together at desired locations to form non-inflatable portions 122 of the inflatable curtain 14. As illustrated in FIG. 2, a seam 120 forms a non-inflatable portion 122 of the inflatable curtain 14 between the first and second chambers 80 and 90. Another seam 124 forms a non-inflatable portion 122 near the intersection of the top edge 108 and the rear edge 79 of the inflatable curtain 14.

The vehicle 12 includes a sensor mechanism 126 (shown schematically in FIGS. 1 and 2) for sensing a side impact to the vehicle 12 and/or a rollover of the vehicle 12. The sensor mechanism 126 actuates the inflator 24 in response to the sensing of a side impact or a vehicle rollover.

In the event of a rollover of the vehicle or a side impact to the vehicle 12 of a magnitude greater than a predetermined threshold value, the sensor mechanism 126 provides an electrical signal over lead wires 128 to the inflator 24. The electrical signal causes the inflator 24 to be actuated in a known manner. The inflator 24 discharges fluid under pressure into the fill tube 22. The fill tube 22 directs the fluid into the inflatable curtain 14.

The inflatable curtain 14 inflates under the pressure of the inflation fluid from the inflator 24. The housing 26 (FIG. 1) opens and the inflatable curtain 14 (FIG. 2) inflates away from the roof 18 in a downward direction as shown in the drawings and in a downward direction with respect to the direction of forward travel of the vehicle 12 into the position illustrated in FIG. 2.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The top edge 108 is positioned adjacent to the intersection of the roof 18 and the side structure 16 of the vehicle 12. The front edge 106 is positioned adjacent to an A pillar 130 of the vehicle 12. The rear edge 79 of the inflatable curtain 14 is positioned adjacent to a C pillar 132 of the vehicle 12. The inflatable curtain 14 extends between the A pillar 130 and the C pillar 132 of the vehicle 12 and overlies at least a portion of the A pillar, C pillar, and a B pillar 134 of the vehicle.

It will be recognized by those skilled in the art, however, that the inflatable curtain may have alternative configurations. For example, in the illustrated embodiment, the inflatable curtain 14 extends between the A pillar 130 and the C pillar 132 of the vehicle 12. The inflatable curtain 14 could, however, extend between the A pillar 130 and the B pillar 134 only or between the B pillar and the C pillar 132 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. When the curtain 14 is inflated, the first and second chambers 80 and 90 are positioned along the side structure 16 of the vehicle 12. The seams 60 and 70 help to limit the thickness of the inflated inflatable curtain 14. The spiral-like configuration of the seams 60 and 70 helps to reduce the load concentration on the seams during inflation of the inflatable curtain and during impacts with the inflatable curtain. The first and second chambers 80 and 90 help to absorb the energy of impacts with the inflatable curtain 14 and help to distribute the impact energy over a large area of the curtain.

From the above description of the invention, those skilled in the art will perceive improvements, changes and modifications. For example, the number of spiral-like chambers 80, 90 and U-shaped chambers 100, 110 in communication with each other could vary depending upon the length of the inflatable curtain 14 along the side structure 16 of the vehicle 12. For example, if the inflatable curtain 14 extended from the A pillar and B pillar of a vehicle, only one spiral-like chamber and U-shaped chamber may be incorporated in the curtain, whereas if the curtain extended from the A pillar and the C pillar or D pillar, two or more spiral-like chambers and two or more U-shaped chambers may be incorporated in the curtain. Such improvements, changes and modifications within the skill of the art are intended to be covered by the appended claims.

Having described the invention, the following is claimed:

1. Apparatus for helping to protect an occupant of a vehicle that has a side structure and a roof, said apparatus comprising:

a vehicle occupant protection device that is inflatable away from the vehicle roof into a position between the side structure of the vehicle and a vehicle occupant; and an inflation fluid source that provides inflation fluid for inflating said vehicle occupant protection device;

said vehicle occupant protection device comprising a seam extending in a spiral-like manner from a location within the outer periphery of the vehicle occupant protection device to define at least one spiral-shaped chamber portion of the vehicle occupant protection device.

2. Apparatus as defined in claim 1, wherein said seam is continuous and uninterrupted.

3. Apparatus as defined in claim 1, wherein said spiral-shaped chamber has a first terminal end located within the outer periphery of the vehicle occupant protection device and a second terminal end located near the outer periphery of the vehicle occupant protection device.

4. Apparatus as defined in claim 3, wherein said device has a U-shaped inflatable chamber portion and said second terminal end of said spiral-shaped chamber is in fluid communication with a U-shaped inflatable chamber portion, one wall of which is formed by said seam.

5. Apparatus as defined in claim 1, wherein said vehicle occupant protection device comprises a plurality of said spiral-shaped chambers.

6. Apparatus as defined in claim 5, wherein said plurality of said spiral-shaped chambers are in fluid communication with each other.

7. Apparatus as defined in claim 1, wherein said vehicle occupant protection device further comprises a pair of overlying panels, said panels having overlapping portions secured together to form said seam.

8. Apparatus as defined in claim 1 wherein said at least one spiral-shaped chamber, when inflated, is adapted to be positioned along the side structure of the vehicle.

9. Apparatus as defined in claim 1, wherein said vehicle occupant protection device is an inflatable curtain having a stored position adapted to extend along the side structure adjacent to a roof of the vehicle, said inflatable curtain being adapted to inflate from the vehicle roof into said position between the side structure of the vehicle and a vehicle occupant.

10. Apparatus as defined in claim 9, further including a fill tube having a portion located in said inflatable curtain, said inflation fluid source being in fluid communication with said fill tube, said inflation fluid source, when actuated, providing inflation fluid to said fill tube, said fill tube directing said inflation fluid into said inflatable curtain to inflate said inflatable curtain.

11. Apparatus as defined in claim 9, wherein said inflatable curtain when inflated is adapted to extend along the side structure of the vehicle between an A pillar and a C pillar of the vehicle.

12. Apparatus as defined in claim 9, wherein said inflatable curtain, when inflated, is adapted to overlie at least a portion of an A pillar, a B pillar and a C pillar of the vehicle.

13. Apparatus as defined in claim 11, wherein said inflatable curtain further comprises first and second inflatable spiral-shaped chambers, said first spiral-shaped chamber, when inflated, being adapted to be positioned between the A pillar and a B pillar of the vehicle, said second spiral-shaped chamber, when inflated, being adapted to be positioned between the B pillar and the C pillar of the vehicle.

14. Apparatus as defined in claim 1, wherein certain portions of said vehicle occupant protection device are uninflated when said at least one spiral-shaped chamber is inflated.

15. Apparatus as defined in claim 1, further comprising a sensor for sensing a vehicle condition for which deployment of said inflatable device is desired, said sensor actuating said inflation fluid source to provide inflation fluid to inflate said inflatable vehicle occupant protection device.

16. Apparatus as defined in claim 1, wherein said inflation fluid source comprises an inflator which is actuatable to inflate said vehicle occupant protection device.

* * * * *